(12) United States Patent
Singh (10) Patent No.: US 7,873,899 B2
(45) Date of Patent: Jan. 18, 2011

(54) MAPPING SCHEMES FOR CREATING AND STORING ELECTRONIC DOCUMENTS

(75) Inventor: Veshaal Singh, Uttar Pradesh (IN)

(73) Assignee: Oracle International Corporation, Redwood Shores, CA (US)

( * ) Notice: Subject to any disclaimer, the term of this patent is extended or adjusted under 35 U.S.C. 154(b) by 519 days.

(21) Appl. No.: 10/656,440

(22) Filed: Sep. 5, 2003

(65) Prior Publication Data
US 2004/0068526 A1 Apr. 8, 2004

Related U.S. Application Data

(60) Provisional application No. 60/416,306, filed on Oct. 4, 2002.

(51) Int. Cl.
*G06F 17/00* (2006.01)
(52) U.S. Cl. ....................................... 715/234; 715/236
(58) Field of Classification Search .................. 715/523, 715/249, 234–236; 707/6
See application file for complete search history.

(56) References Cited

U.S. PATENT DOCUMENTS

| | | | | |
|---|---|---|---|---|
| 6,604,100 | B1 * | 8/2003 | Fernandez et al. .............. | 707/3 |
| 6,643,633 | B2 * | 11/2003 | Chau et al. ...................... | 707/1 |
| 6,732,095 | B1 * | 5/2004 | Warshavsky et al. ........... | 707/5 |
| 6,804,677 | B2 * | 10/2004 | Shadmon et al. ............ | 707/101 |
| 6,823,495 | B1 * | 11/2004 | Vedula et al. ................ | 715/805 |
| 6,871,204 | B2 * | 3/2005 | Krishnaprasad et al. ..... | 707/102 |
| 6,959,416 | B2 * | 10/2005 | Manning et al. ............. | 715/227 |
| 7,024,425 | B2 * | 4/2006 | Krishnaprasad et al. .. | 707/104.1 |
| 7,174,327 | B2 * | 2/2007 | Chau et al. ...................... | 707/3 |
| 7,219,102 | B2 * | 5/2007 | Zhou et al. .................. | 707/101 |
| 7,228,312 | B2 * | 6/2007 | Chaudhuri et al. .......... | 707/102 |
| 7,260,585 | B2 * | 8/2007 | Krishnaprasad et al. ..... | 707/102 |
| 2002/0078068 | A1 * | 6/2002 | Krishnaprasad et al. .. | 707/104.1 |
| 2002/0184213 | A1 * | 12/2002 | Lau et al. ........................ | 707/6 |

OTHER PUBLICATIONS

Stylus Studio, Database-to-XML Mapping, 2007, Stylus Studio, pp. 1-2.*
Denise Draper, Mapping between XML and Relational Data, Feb 6, 2004, informIT, pp. 1-25.*
Eclipse, AMW Use Case- Data mapping between relatioanl database and XML, 2008, The Eclipse Foundation, pp. 1-5.*

* cited by examiner

*Primary Examiner*—Stephen S Hong
*Assistant Examiner*—Manglesh M Patel
(74) *Attorney, Agent, or Firm*—Hickman Palermo Truong & Becker LLP (57) ABSTRACT

A method is provided for generating mapping schemes for creating target electronic documents with data from a source, and for storing data from source electronic documents into a target. Commands from a user are received creating a mapping between the attributes of the source and the attributes of the target. Multiple attributes of the source may be mapped to a single attribute of the target, and multiple attributes of the target can be mapped to a single attribute of the source. Commands, specifying actions to be performed when data from the source is converted to the target, may also be received from a user. A mapping scheme is then generated using the mapping between the source and target attributes, and the actions defined on the source and the target.

28 Claims, 5 Drawing Sheets

MAPPING SCHEMES FOR CREATING AND STORING ELECTRONIC DOCUMENTS

This application claims the benefit and priority of U.S. Provisional Application No. 60/416,306, filed on Oct. 4, 2002, the entire contents of which are incorporated herein by reference.

FIELD OF THE INVENTION

The present invention relates to electronic transferring of data and, more particularly, to generating mapping schemes used to create and store electronic documents with data.

BACKGROUND OF THE INVENTION

A business organization usually keeps and manages its business information using software applications which are commonly referred to as Business Applications. The data of a Business Application is usually stored in a database and is organized in a number of entities. An entity is a structure for storing data, where the data within the structure is typically grouped together on the basis of some common characteristics. For example, a Purchasing Application may keep data about trading partners, purchasing orders, shipments, invoices, and inventory. Thus, the Purchasing Application may have separate entities for storing data about the Trading Partners, the Purchasing Orders, the Shipments, the Invoices, and the Inventory. Different Business Applications are developed at different points in time by different software makers, and thus entities for storing the same data are usually different in the different Business Applications.

Data that is transferred between Business Applications is usually transferred in the form of well-defined electronic documents. Typically, different industries will define different standards for electronic documents. For example, the manufacturing industry adheres to Open Applications Group standards, and the semi-conductor and telecom industries adhere to RosettaNet standards. However, since different Business Applications, supported by different databases, store data in different entities, a problem arises when entity data from one Business Application needs to be stored in a standard electronic document that can be transferred to another Business Application. The same problem arises when data from an electronic document needs to be stored (or consumed) in the entities of a Business Application. The problem is further exacerbated because of the differences in how an entity is structurally represented in the various databases and in the various electronic documents. Furthermore, an entity used by one Business Application may be represented by two or more entities in another Business Application, which will create even more difficulties when the data from the entity needs to be stored into or retrieved from an electronic document governed by a particular standard.

One approach to solve the problem is the "hard-coding" approach. Under this approach a programming language is used to write a computer program. The computer program will store in its code all the necessary information to extract data from specific entities to generate electronic documents, or to store external data from electronic documents into specific entities. In either case, the computer program will contain all the information about the structure of the particular electronic document to which data is to be written or from which data is to be read. It is apparent that this approach is very labor-intensive and cost-ineffective, especially when a Business Application has a large number of entities and needs to write to or read from a large number of differently-structured electronic documents. Furthermore, since Business Applications evolve, from time to time entities may be changed and thus the computer program must be modified to accommodate these changes. Similarly, the standards governing the structure of the electronic documents may also change which will require corresponding changes in the computer program.

Another approach to solving the problem is the "canonical format" approach. Under this approach, the data from selected entities is first stored into a second set of entities. In the second set of entities the data is arranged in a predefined fixed format (i.e. a canonical format). Once the data is stored in canonical format, a second set of transformations is performed on the data to convert it into an electronic document governed by a particular standard. The second set of transformations is essential under this approach since the standard electronic document may or may not fully support the predefined canonical format. One implementation of this approach may include using XSQL to transform the data to the canonical format. XSQL is the combination of the XML (Extensible Markup Language) and the SQL (Structured Query Language) to provide a language and means to store and retrieve data from the database entities.

One issue with the canonical format approach is that it requires at least two sets of data transformations to create a standard electronic document. Specifically, it requires one transformation from the original data format to the canonical format, and a second transformation from the canonical format to the format of the target electronic document. This issue is particularly acute when a large amount of data needs to be converted to an electronic document because processing a large amount of data at least twice may consume a lot of computing resources (such as computer memory, processor time, etc.). Another issue with the canonical format approach is that is very inflexible. The standards governing the electronic documents evolve and change with time, and in order to fully support standard electronic documents, the programming language (such as XSQL) used to transform data into the canonical format must also evolve and change.

Based on the forgoing, it is desirable to provide a flexible mechanism through which data from entities in a Business Application is efficiently converted to electronic documents governed by particular standards, and through which data from electronic documents governed by particular standards are stored in the entities of a Business Application.

Entities can be represented in a variety of ways in Business Applications and in electronic documents. For example, in a Business Application supported by a relational database, an entity can be represented as a table, or a set of tables, having columns, each column being able to hold data of a particular data type. On the other hand, electronic documents can use different elements to represent an entity. For example, in an electronic document in the XML format, an entity can be represented as a node containing elements, the elements further containing attributes.

Systems that implement the present invention, however, are not limited to any particular type of entity, any particular type of database, any particular type of a Business Application, or any particular type of electronic document. For the purpose of explanation, all the elements, properties, and characteristics representing and describing an entity, in an electronic document or in a Business Application (and its supporting database), will be hereafter referred to as attributes. Furthermore, an electronic document or a database (along with the Business Application it supports) which contains the entities with the data will be hereafter referred to as a source. Similarly, an electronic document or a database (along with the Business Application it supports) which is to receive data in its entities will be hereafter referred to as a target.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A method for generating mapping schemes for creating electronic documents with data and storing data from electronic documents is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Logical Levels

The description hereafter includes references to logical "levels" that may exist at one or both of the database side and the XML side. With respect to the database side, any Entity comprises various elements in it. For example, an EMP table (an entity on the database side) consists of empno,empdate, empname ( as columns/elements ). This becomes a Logical entity. Also a Business Document can consist of multiple entities to represent the whole Business Document. For example, a Purchase order might consists of Header,Lines and Shipments as logical entities to describe it.

With respect to the XML side, if this PO has to be represented on the XML Side, a DTD or an XML Schema is used to describe the grammar. On the DTD side, each of the elements can have 0, 1 or more than 1 occurrence. In order to identify which elements on the DTD side belong to the entity on the source side, the unique approach is in identifying that Element as a Logical Level. This logical level on the target side can represent the Source Logical Level. Similarly all the logical entities on the Source side can be mapped to the Logical entity on the target side. In the description provided hereafter, this is referred to as Level Mapping between the Source and the Target.

Consider, for example, a Business Document which consists of various entities in the Database and which needs to be converted to a XML format which is represented as a DTD. In this example, the Database Side is the Source. With respect to Purchase Order, Header is the parent. Lines is a child entity of Header, and the shipment is a child entity of Lines. This can logically be illustrated as:

```
Header
    attribute . . . 1
    attribute . . . n
Lines
    attribute . . . 1
    attribute . . . n
Shipments
    attribute . . . 1
    attribute . . . n
XML Side - Target - Sample DTD Representation
PO(Header)
Header(Attribute1 . . . n-4, Lines*, Attributes n-3,
Attributes n-2, Attributesn-1, Attribute n)
Lines(Attribute1 . . . n-4, Shipments*, Attributes n-3,
Attributes n-2, Attributesn-1, Attribute n)
Shipments(Attribute1 . . . n)
```

For the purpose of this example, assume that all the above elements are defined as PCDATA.

| level_id | parent_level | level_name |
|---|---|---|
| Source Levels | | |
| 1 | 0 | Header |
| 2 | 1 | Lines |
| 3 | 2 | Shipments |
| Target Levels | | |
| 1 | 0 | Header |
| 2 | 1 | Lines |
| 3 | 2 | Shipments |

In order to establish a simple relationship on the two sides, where each entity on the Source side gets represented into an equivalent relationship on the Target side, the following Level Mapping is performed between the Source Side and the Target Side.

| Source level_mapping_id | Target source_level_id | target_level_id |
|---|---|---|
| 1 | 1 | 1 |
| 2 | 2 | 2 |
| 3 | 3 | 3 |

```
For Each Occurrence of Source Level (Header)
    the Header of the Target is printed
    For each occurrence of Source Levels (Lines)
        the Lines of the Target are printed
        For each occurrence of Source Level (Shipments)
            the Shipment of the Target) is printed
        end for
    end for
end for
```

Collapse and Expansion

The above example involved a very simple relationship. It gets complicated when the relationship on the Source and Target is not one-to-one. Consider the following example:

Collapse of Levels:

| level_id | parent_level | level_name |
|---|---|---|
| Source Levels | | |
| 1 | 0 | Header |
| 2 | 1 | Lines |
| 3 | 2 | Shipments |
| Target Levels | | |
| 1 | 0 | Header |
| 2 | 1 | Lines | and the Level Mapping would be:

| Source level_mapping_id | Target source_level_id | target_level_id |
|---|---|---|
| 1 | 1 | 1 |
| 2 | 2 | 2 |
| 3 | 3 | 2 |

Expansion of Levels

| level_id | parent_level | level_name |
|---|---|---|
| Source Levels | | |
| 1 | 0 | Header |
| 2 | 1 | Lines |
| 3 | 2 | Shipments |
| Target Levels | | |
| 1 | 0 | Header |
| 2 | 1 | Lines |
| 3 | 2 | Shipments |
| 4 | 3 | Accounts | and the Level Mapping would be:

| Source level_mapping_id | Target source_level_id | target_level_id |
|---|---|---|
| 1 | 1 | 1 |
| 2 | 2 | 2 |
| 3 | 3 | 3 |
| 4 | 3 | 4 |

With respect to the Cartesian product, when n X m rows are collapsed, the result would be n rows only. For expanding n rows into 2 levels, would result into n rows X n rows for each level.

Functional Overview

A method is provided for generating mapping schemes for creating target electronic documents with data from a source, and for storing data from source electronic documents in a target. Information about the attributes of the source is read in a source data definition, and information about the attributes of the target is read in a target data definition. The attributes of the source and the target may be arranged in hierarchical levels within their respective data definitions. Commands from a user are then received creating a mapping between the attributes of the source and the attributes of the target. Multiple attributes of the source may be mapped to a single attribute of the target, and multiple attributes of the target can be mapped to a single attribute of the source. Where the source and target attributes are arranged in hierarchical levels, multiple hierarchical levels of the source may be mapped to a single hierarchical level of the target, and multiple hierarchical levels of the target may be mapped to a single attribute of the source. Commands, specifying actions to be performed when data from the source is converted to the target, may also be received from a user. A mapping scheme is then generated using the source and target data definitions, the mapping between the source and target attributes, and the actions defined on the source and the target. The mapping scheme can then be used to create a target electronic document with data from the source, or to store data from a source electronic document into the target.

Each mapping scheme represents a mapping of source attributes to target attributes. A mechanism is provided for reading information about the attributes of the source (the source data definition) and information about the attributes of the target (the target data definition). Further, a mechanism is provided for receiving commands from a user that establish a mapping between one or more attributes of the source and one or more attributes of the target. As part of the mapping scheme, a mechanism is also provided for defining actions associated with the source and the target where the actions specify operations to be performed when the mapping scheme is used to create an electronic document with data from the source or to store (or consume) an electronic document with data in the target. The mapping scheme is automatically generated by using the source and target data definitions, the mapping, and may include the actions associated with the source and the target.

Reading Source and Target Data Definitions

The data definition of a source or a target includes information about some or all of the source or target attributes. Depending on the underlying structure of the source or target, the information may include different details about these attributes. Furthermore, in one aspect of the invention, the attributes may be arranged in hierarchical levels representing the parent-child relationships among the attributes which implicitly or explicitly exist in the source or the target.

The source and the target can be any structure that can hold data. In one embodiment of the invention, the source can be a database or an XML document, and the target can be the other of a database or an XML document. In a different embodiment, at least one of the source and the target can be an XML document. In yet a different embodiment, both the source and the target are XML documents. However, the structure of the source and the target are not limited to a database or an XML document. Rather, any structured electronic document that can hold data (e.g. a spreadsheet, a fixed-width file, a delimited file, etc.), can serve as a source or a target.

Depending on the underlying structure of the source or target, the corresponding data definition will include specific details about the attributes and the particular format of the source or target. For example, for a source or target that is a database, the data definition may include table or view names, column names, column data types, column defaults, as well as information needed to access the database itself. For a source or target that is an XML document, the data definition may be based on an XML document or on an XML Document Type Definition (DTD), and may include XML or DTD file name, root node, sibling nodes if any, elements with their associated data types, and element attributes. Reading a source or target data definition may be accomplished by using a variety of methods, including, but not limited to, requiring user input through a User Interface (UI), and automatically, by directly accessing the structure of the underlying source or target.

In one embodiment of the invention, a number of the attributes of a source can be arranged in hierarchical levels where at least one level includes a collection of data that repeats. For example, Purchase Order lines (and their associated attributes) represent a level within a Purchase Order because there are multiple Purchase Order lines to a single Purchase Order. Likewise, a number of the attributes of a target can also be arranged in similar hierarchical levels. Arranging attributes in hierarchical levels can be accomplished by employing various means, including, but not limited to, by requiring user input through a UI, or by directly accessing the underlying source or target structure.

Figure 1:
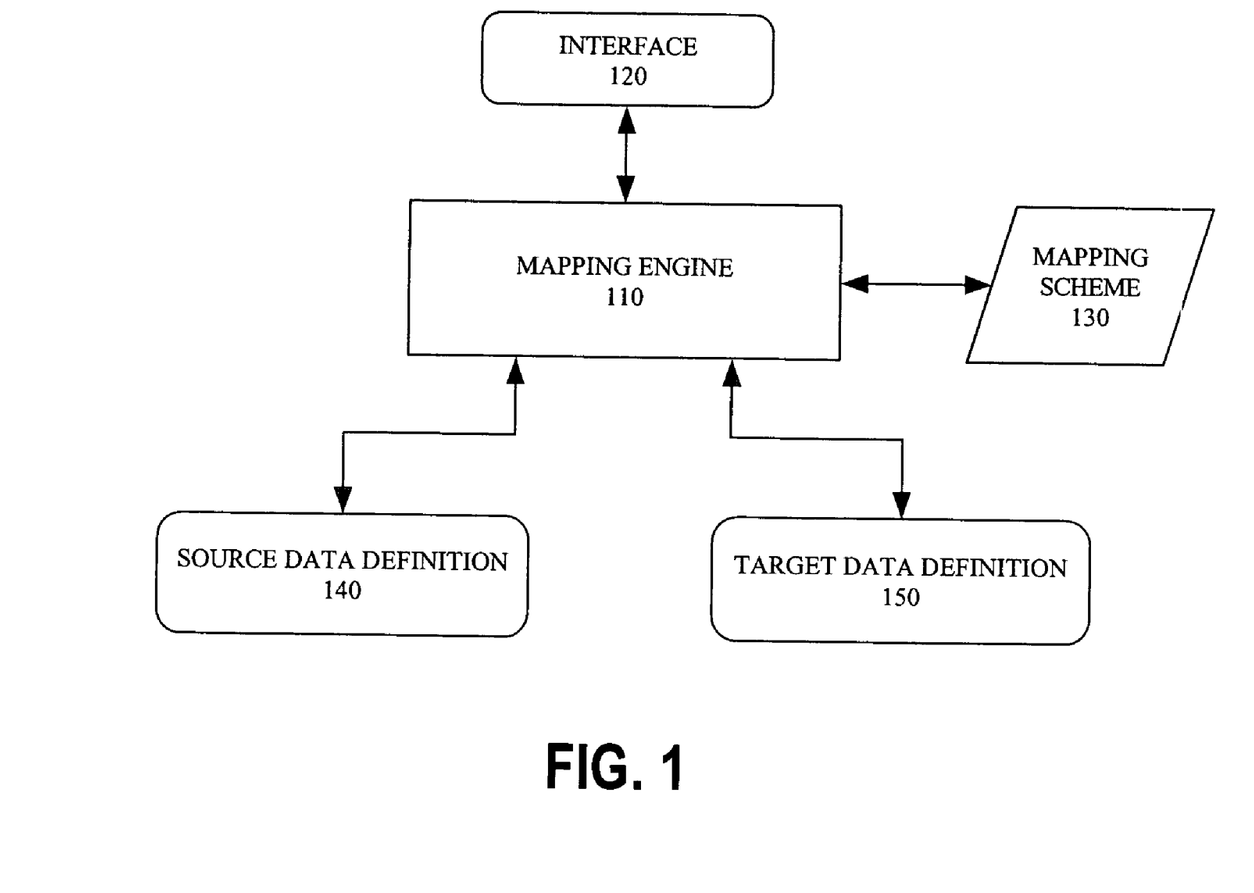
FIG. 1 is a block diagram illustrating a system for creating a mapping scheme, under an embodiment of the invention.

Referring now to FIG. 1, the mapping engine 110 reads the source data definition 140 and the target data definition 150, and stores both data definitions in the mapping scheme 130. The mapping engine 110 may also receive input from a user through the interface 120. The interface 120 can be implemented as a UI with drop-down menus, drag-and-drop capabilities, etc., or as any technique that allows a user to direct a computer system to perform a certain action.

Receiving Commands to Create a Mapping

In one embodiment of the invention, the interface 120 shown in FIG. 1 is also used to receive commands from a user establishing a mapping between one or more attributes of the source, as specified in the source data definition, and one or more attributes of the target, as specified in the target data definition. The mapping may include multiple attributes of the source mapped to a single attribute of the target, and multiple attributes of the target mapped to a single attribute of the source. Where the source and the target attributes are arranged in hierarchical levels, the mapping may also include a number hierarchical levels of the source mapped to the same or different number of hierarchical levels of the target.

Commands received from a user are used to define a mapping between the attributes of the source and the attributes of the target. One or more attributes of the source may be associated with one or more attributes of the target. Furthermore, multiple attributes of the source may be mapped to a single attribute of the target, thus establishing a many-to-one relationship between these source and target attributes. Similarly, multiple attributes of the target may be mapped to a single attribute of the source thus establishing a one-to-many relationship between these source and target attributes.

For example, in a Purchasing Application, a Purchase Order may be represented by three attributes—Header, Lines, and Shipping. In an Order Management Application, an electronic document forming a Process Order may be represented by only two attributes—Header and Lines, with the Shipping attribute being stored within the Lines attribute. Thus, if the Order Management Application is to be able to store and process the Purchase Order, in addition to mapping the Header attribute of the Purchase Order to the Header attribute of a Process Order, it is necessary that the Lines and Shipping attributes of the Purchase Order are mapped to the Lines attribute of the Process Order. In this case there is a many-to-one relationship between the Lines and the Shipping attributes of the Purchase Order and the Lines attribute of the Process Order.

Establishing the many-to-one and one-to-many relationships between the source attributes and the target attributes can also be referred to as collapsing (de-normalizing) and expanding (normalizing). Collapsing from the viewpoint of the source is expanding from the viewpoint of the target, and expanding from the viewpoint of the source is collapsing from the viewpoint of the target. That is, whenever a number of source attributes are collapsed into a smaller number of target attributes, this same number of target attributes are expanded to a greater number of source attributes, and whenever a number of source attributes are expanded to a greater number of target attributes, this same number of target attributes are collapsed into a smaller number of source attributes.

Figure 4:
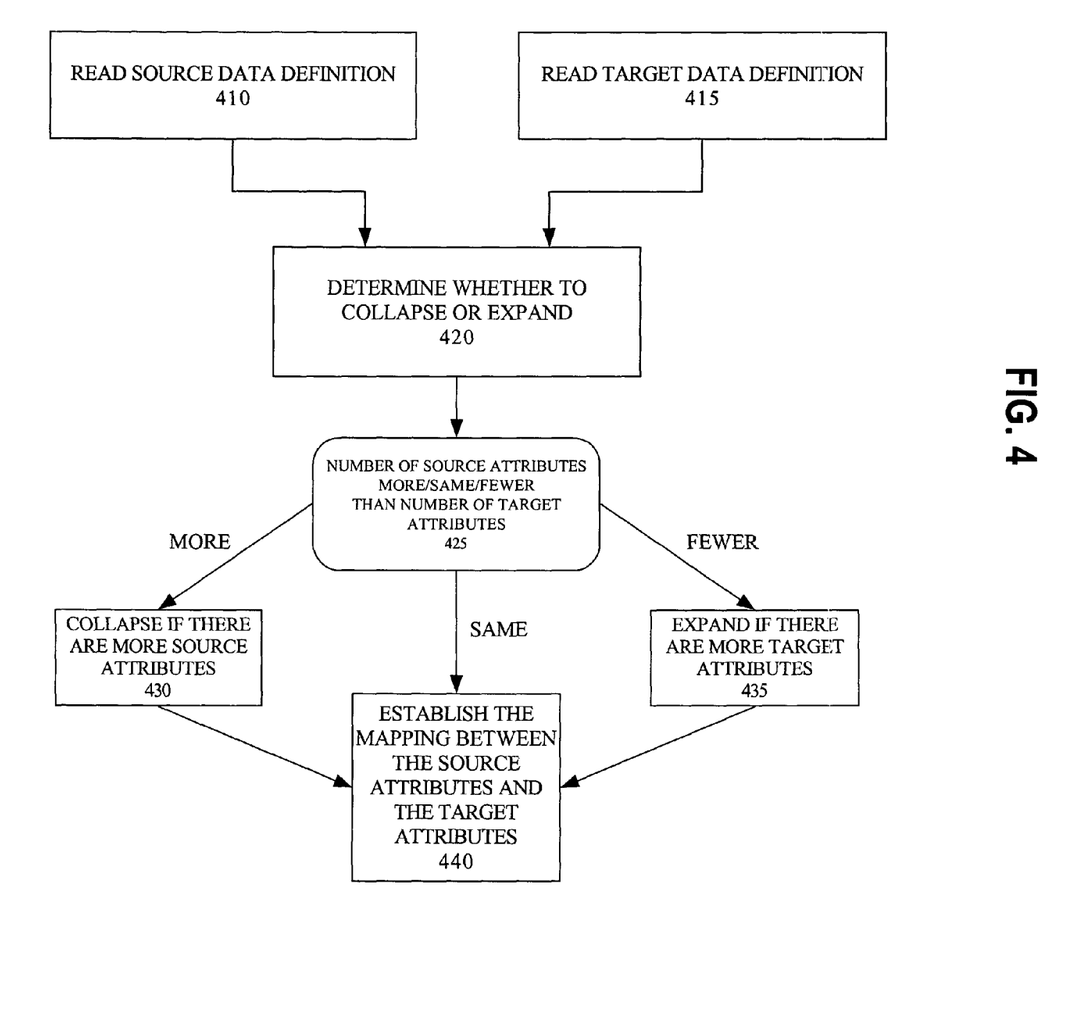
FIG. 4 illustrates a method for collapsing or expanding attributes when mapping the source attributes to the target attributes.

As illustrated in FIG. 4, reading source data definition 410 and reading target data definition 415 are performed before determining whether collapsing or expanding 420 is necessary. Determining whether to collapse or expand may be based on the commands received from a user that specify which attributes of the source correspond to which attributes of the target. At step 425 the number of source attributes that are mapped is compared to the number of the corresponding target attributes. If the source attributes are mapped to the same number of target attributes, then no further steps are performed before step 440 (the step of establishing the mapping between the source and the target attributes). If the number of source attributes corresponds to a smaller number of target attributes, then the collapsing step 430 must be performed before the 440 step of establishing the mapping between the source and the target attributes. Similarly, if the number of source attributes corresponds to a greater number of target attributes, then the expanding step 435 must be performed before step 440.

In different mappings some source attributes may be collapsed to a smaller number of target attributes, and other source attributes may be expanded to a greater number of target attributes. In more complex mappings, any combination of the above-described collapsing and expanding may be required with respect to any number of source and target attributes.

In one embodiment of the invention, the source and the target attributes are arranged in hierarchical levels when the source and the target data definitions are established. In this embodiment, the mapping may also include a number hierarchical levels of the source mapped to the same or different number of hierarchical levels of the target. The commands received from a user may specify that a number of hierarchical levels of the source are collapsed in a smaller number of hierarchical levels of the target, or that a number of hierarchical levels of the source are expanded to a greater number of hierarchical levels of the target. In more complex mappings any combination of the above-described collapsing and expanding of hierarchical levels may be required with respect to any number of source and target hierarchical levels.

Furthermore, when a number of source hierarchical levels are collapsed into a smaller number of target hierarchical levels, the attributes included in the source hierarchical levels may correspond to a smaller number of attributes from the target hierarchical levels. Similarly, when a number of source hierarchical levels are expanded to a greater number of target hierarchical levels, the attributes included in the source hierarchical levels may correspond to a greater number of attributes from the target hierarchical levels. Thus, after the source hierarchical levels have been mapped to the target hierarchical levels, the mapping of attributes from the source hierarchical levels to attributes of the target hierarchical levels may need to further be established. This mapping of attributes can be accomplished in a variety of ways, including but not limited to, by automatically using the mapping between the source and target hierarchical levels, and, according to one embodiment of the invention, by receiving commands from a user specifying which of the attributes of the source hierarchical levels are mapped to which of the attributes of the target hierarchical levels.

In sum, in response to commands from a user, a mapping is established between the attributes of the source and the attributes of the target. Multiple source attributes may be mapped to a single target attribute, and a single source attribute may be mapped to multiple target attributes. These techniques of mapping are also referred to as collapsing and expanding correspondingly. When the source and the target attributes are arranged in hierarchical levels, the source and target hierarchical levels may also be collapsed or expanded as part of the mapping. Once the mapping is established, it is used to create the mapping scheme.

Receiving Commands to Define Actions

In addition to the mapping between source and target attributes, the mapping scheme may include one or more actions associated with the source and the target. The actions will specify the data converting operations to be performed when the mapping scheme is used to store data, from the source, in an electronic document or conversely to store data, from an electronic document, in the target. The commands defining the actions may be received from a user through a UI, or through any other technique that allows a user to direct a computer system to perform a certain action.

The commands received from a user may specify whether a particular action, and its associated operation, is to take place before, during, or after the source data is converted to the target document according to the mapping scheme. Thus, when the mapping between the source and the target attributes is very complex, the user is provided with the ability to selectively apply different actions at the different stages of converting the source data to or from the format of the target. In one embodiment of the invention, the actions included in the mapping scheme may also be grouped to represent a transaction. The actions included in the transaction are performed when the mapping scheme is used to convert the source data to the format of the target.

The set of actions available for selection by a user may include, but is not limited to, evaluating a condition, compiling and executing a specific set of instructions, declaring variables and assigning values to them, and executing precompiled routines. Commands received from the user may specify a particular condition which must be satisfied before a particular operation to convert data is performed. In one embodiment of the invention, the condition is stored as part of the mapping scheme, and when the mapping scheme is used to convert data from the source to the format of the target, a determination is made whether the condition is satisfied. If the condition is satisfied, then the particular data-converting operation is performed.

For example, a user may need to create a target electronic document with data from the source only upon request. In this case, the user may declare a condition specifying that the target electronic document will be created only if a registered recipient has requested it. When the mapping scheme is used to generate the target electronic document, a check is performed to confirm that the recipient is indeed registered, and the data from the source is converted to the format of the target only if the recipient has a valid registration.

User-Specified Routines

The mapping scheme may also include a data-converting operation with a specific set of instructions as specified in a user input. The set of instructions may be stored in the mapping scheme as part of the operation. When the mapping scheme is used to convert data from the source to a format associated with the target, the operation may be invoked which will cause the specific set of instructions to be compiled and executed. In one embodiment of the invention, the source is an Oracle database, and the specific set of instructions may include statements, functions or procedures written in PL/SQL (the structured query language used in Oracle databases to most efficiently access and manipulate data from the database attributes). However, any set of instructions capable of being compiled, such as instructions written in any scripting or programming language, may be stored in a mapping scheme and executed upon converting data from the source to the format of the target.

As part of the set of actions to be stored in the mapping scheme, the user input may specify that a particular precompiled routine is called as part of a data-converting operation. When the operation is performed to convert data from the source to the format of the target, the operation may be performed and may call the precompiled routine. Precompiled routines may include, but are not limited to, database functions (if the source or target is a database), operating system functions, mathematical functions, and string-manipulating functions.

User-Specified Variables

Input received from a user may specify, and the mapping scheme may further include, an action associated with an operation which requires the use of a variable. When the operation is performed during the conversion of the source data to the target format, a variable may be declared, a value may be associated with the variable, and the operation may use the variable to manipulate the data. Different types of variables (e.g. local, global, etc.) may be used in the mechanism described above. Further, the values assigned to the variables may come from a variety of sources, such as the source or target attributes, the status of a previously executed operation, a precompiled data-manipulating routine, a system or other function, or may be constant values.

For example, a user may need to date-stamp the data in a target electronic document that is created with data from the source. When the mapping scheme is used to generate the electronic document, a variable is declared and the current date is stored in the variable. The data from the source is then converted to the format of the target electronic document, and during the conversion the variable may be assigned to a target attribute designated for storing the date of data conversion.

The mapping scheme is not limited to including only those types of actions described above (i.e., to evaluating a condition, compiling and executing a specific set of instructions, declaring variables and assigning values to them, and executing precompiled routines). Complex mappings between the source and target attributes may require different types of actions to be defined, and so long as an action can be represented and included in the mapping scheme, alternative embodiments of the invention may allow a user to specify any type of action supported by a high level programming language. Furthermore, complex mappings may require actions defined to affect the whole source or target, or may require actions defined to affect only a subset of the attributes included in the source and target data definitions.

Generating and Using the Mapping Scheme

Once the source and target data definitions have been read, and the mapping between the source and the target attributes has been established, the mapping scheme may be automatically generated by the mapping engine. The mapping scheme may include the actions associated with the source and the target as specified by a user. The mapping scheme may be used immediately or saved for future and/or repeated use.

Once generated, the mapping scheme can be used to create target electronic documents with data from a source, or conversely to store (consume) data from a source electronic document into a target.

In one embodiment of the invention, the source and target definitions included in the mapping scheme can be stored as separate files, and the mapping between the source and target attributes can be stored in a different file. However, the mechanism described herein for generating a mapping scheme is not limited to saving different portions of the mapping scheme in separate files. In fact, the information included in the mapping scheme, in its entirety or any portions of it, can be stored in a number of ways, including, but not limited to, saved in a file or files, and loaded in a database repository or tables. Generally, any method for storing data in electronic format can be used to store the mapping scheme. In addition, the mapping scheme does not necessarily need to be stored permanently, but can also be generated and kept in memory only for the duration of its use to create or store electronic documents with data.

Figure 3:
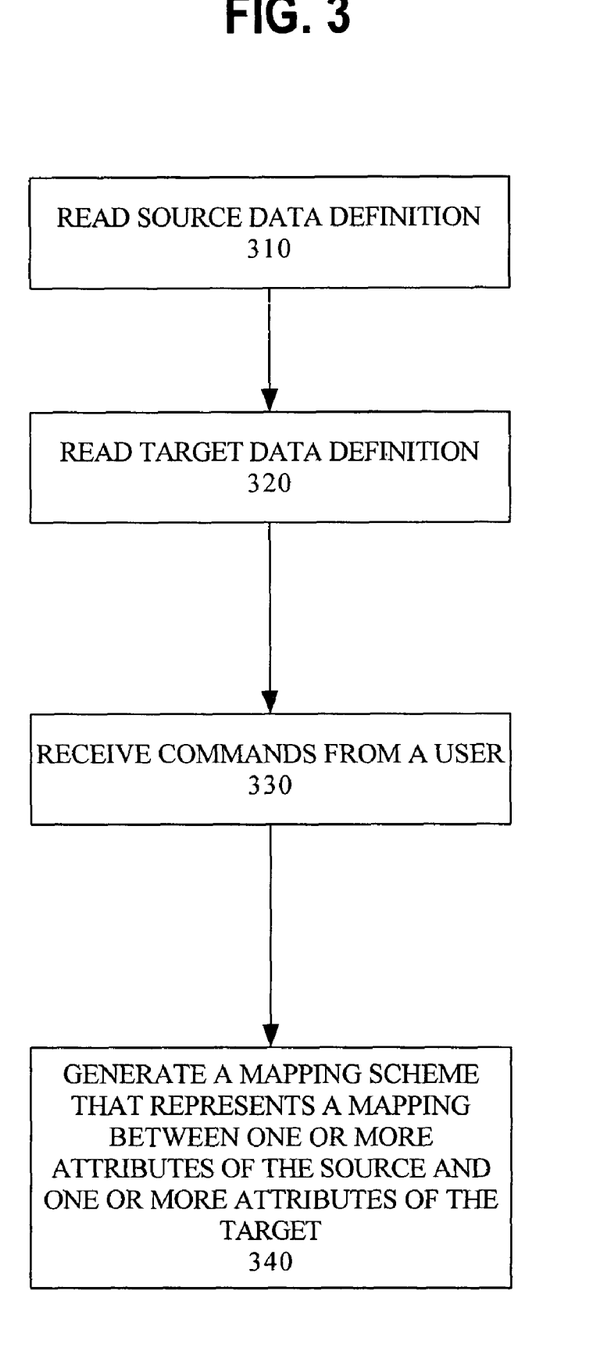
FIG. 3 illustrates a method for creating a mapping scheme.

Referring now to FIG. 3, the steps of the method for generating the mapping scheme are described. The source data definition is read in step 310, and the target data definition is read in step 320. However, there is no requirement that steps 310 and 320 are to be performed in this order, and this arrangement is presented herein only for illustrative purposes. At step 330, commands are received from the user defining the mapping between the source and the target attributes including commands specifying collapsing or expanding if necessary. Any commands defining actions to be performed on the source or target attributes are also received at step 330. At step 340 a mapping scheme, representing the mapping between the source and the target attributes and including any actions defined by a user, is generated.

Once generated, the mapping scheme can be used to create an electronic document with data from the source in the particular format required by the target data definition. The data from the source is converted to the target format, according to the mapping between the source and target attributes and according to the actions defined by the user if any, and is stored in the electronic document. Similarly, the mapping scheme can be used to store in the target data from a source electronic document with a particular format as specified in the source data definition. The data from the electronic document is converted to the format required by the target, according to the mapping between the source and target attributes and according to the actions defined by the user if any, and is stored (consumed) in the target.

Figure 2:
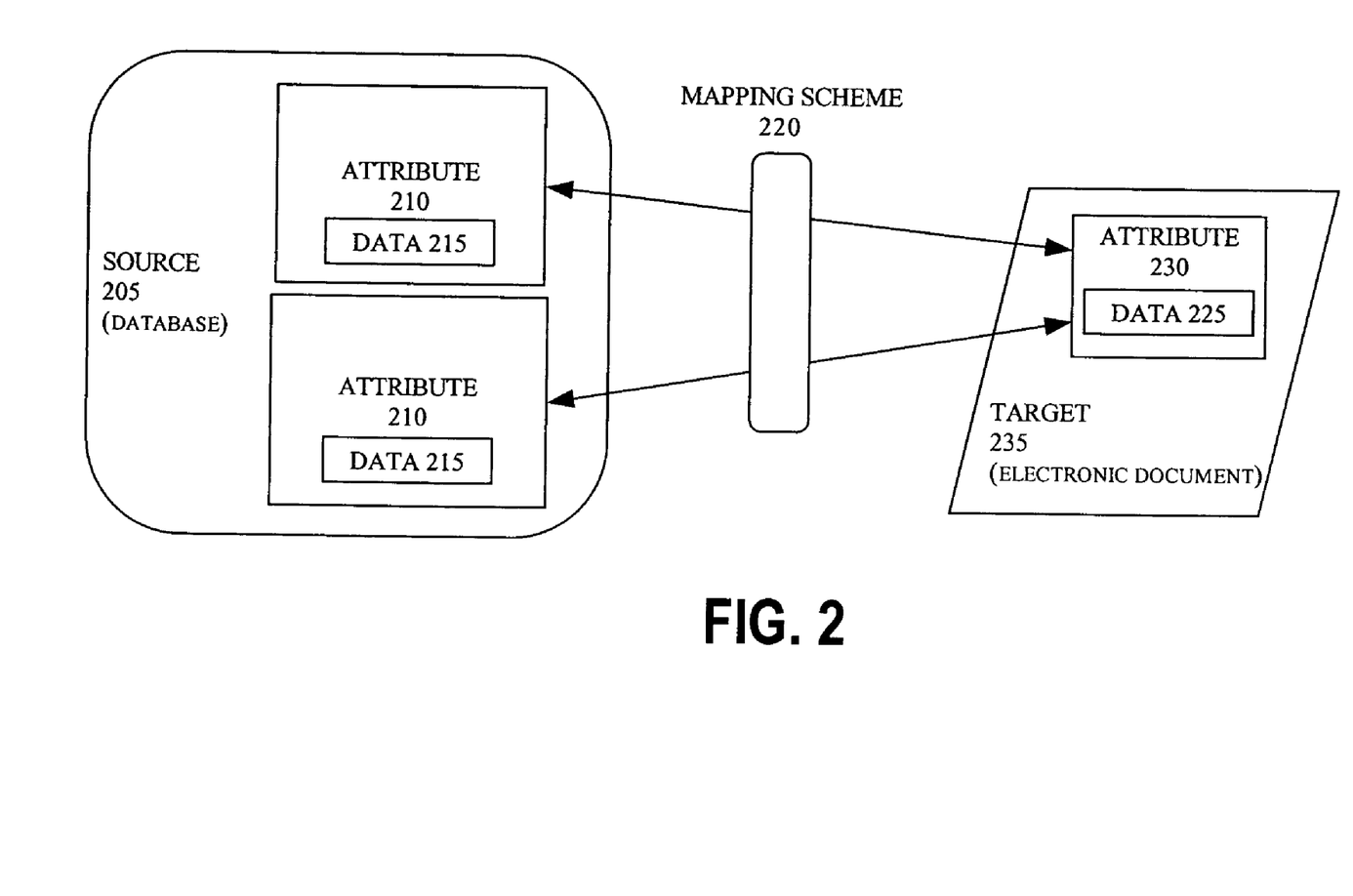
FIG. 2 illustrates a system in which electronic documents are generated using a mapping scheme under an embodiment of the invention.

Using the mapping scheme according to one embodiment of the invention is described in FIG. 2. The source database 205 includes data 215 contained in the source attributes 210. The data 215 is converted according to the mapping scheme 220 to data 225 contained in the target attribute 230, and the target electronic document 235 is created. The mechanism just described does not limit the source to being a database and the target to being an electronic document. An electronic document with data can also serve as a source, and a database can also serve as a target. Furthermore, in one embodiment of the invention, one electronic document can serve as a source and another electronic document can serve as the target. Any structure capable of holding data can serve as a source or target, and the use of a database as a source and an electronic document as a target is herein described only for illustrative and exemplary purposes.

Hardware Overview

Figure 5:
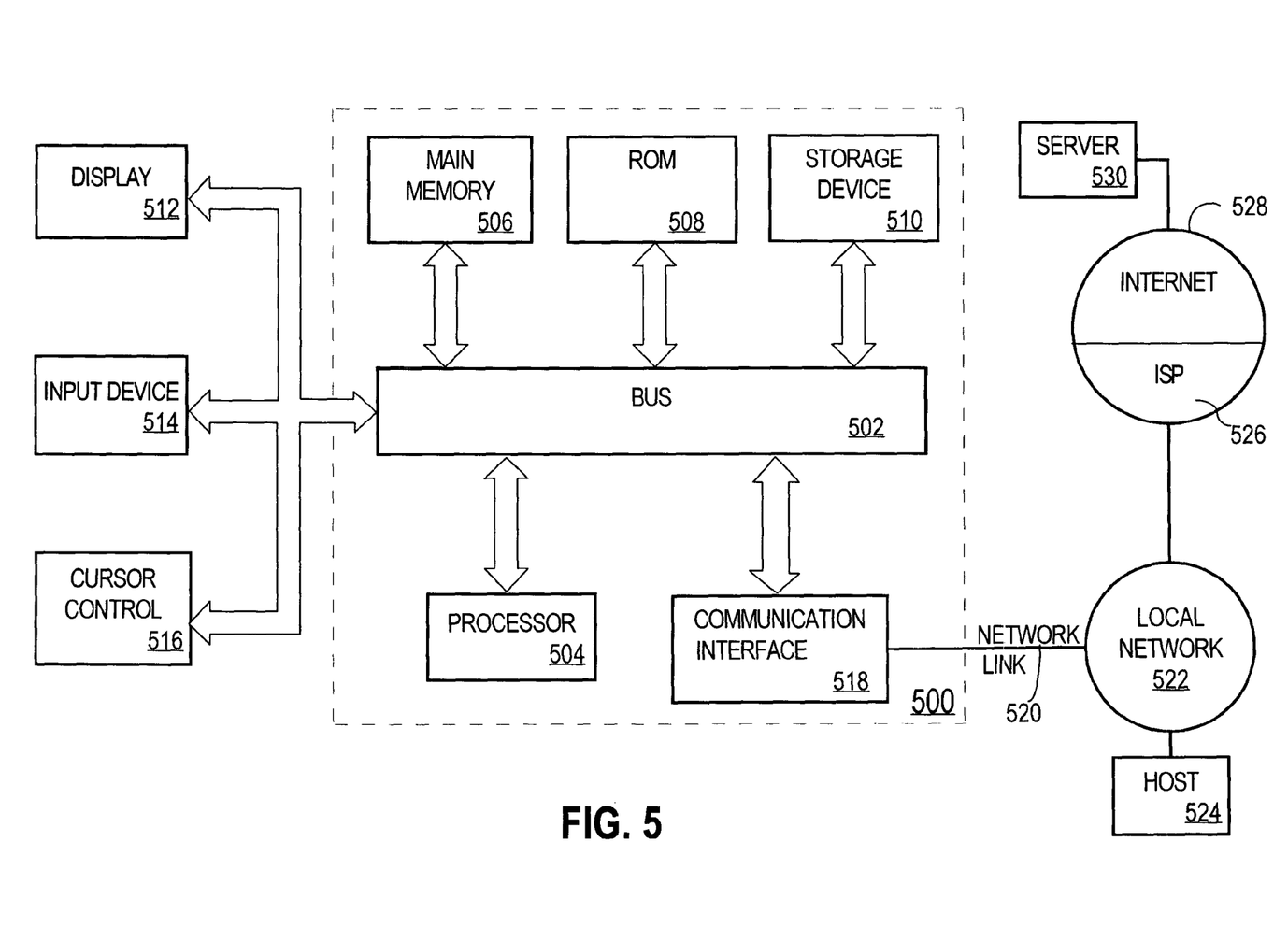
FIG. 5 is a block diagram of a computer system on which embodiments of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for creating the techniques described herein. According to one embodiment of the invention, those techniques are performed by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 5 10, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Using a Programming Language for Data Transformations

The extraction of business data from the various application entities and its complex representation on the XML document which adheres to a given standard, requires complex set of mapping. This complex mapping amounts to the creation of a high level programming language which sits on top of the complex database entities and the XML representation and the nodes at the same time.

The creation of the programming language with a easy to use interface and the ability to represent the complex mapping in the database of the choice Oracle, and the most efficient language which can extracts data from the Oracle Database i.e. PL/SQL, is what unique about the solution provided by the approach described herein. This mapping tool provides the capabilities of a typical programming language, for example:

Define variables with data types and with default values.
Assignment operations Conditional statement evaluation (<,>,=,!=, null, not null, etc)
Mathematical functions like add, subtract, divide and multiply.

Since this requires high performance, the GUI tool generates ID's which are directly used by the code to fetch the data on the id as the index provides the fastest performance in the PL/SQL layer.

Direct Data Transformations

When the data is extracted from and consumed into the various entities, typically 80% can be done straight from entities. But for the remaining 20%, a capability is provided to make calls to PL/SQL procedures and functions. A unique ability to tie the entities and the PL/SQL procedures and functions, and represent it as a business transaction is also what is unique about the solution provided by the approach described herein.

The processing sequence of a three-level document by an XML gateway execution engine according to the approach described herein is provided in Table 3-5 below.

TABLE 3-5

| LEVEL | STAGE |
| --- | --- |
| Root | Pre-Process |
| Root | In-Process |
| Header | Pre-Process |
| Header | In-Process |
| Header | Post-Process |
| Line | Pre-Process |
| Line | In-Process |
| Line | Post-Process |
| Line Detail | Pre-Process |
| Line Detail | In-Process |
| Line Detail | Post-Process |
| Root | Post Process |

Given the processing sequence described above, header data is processed before line data and line data is processed before detail data. Any upper level data element that has a dependency on a lower level data elements (for example, sum of invoice lines) must be processed using an API call at the upper level. Once the upper level data is processed, it cannot be updated although it can always be accessed.

An action can be applied at any of the following stages of message creation or consumption:

Pre-Process
   A pre-process action is executed before the message is created or consumed. The Create Global Variable action is an example of a preprocess action. The variable must be defined before it can be used.

In-Process
    An in-process action is executed during message creation or consumption. The Math and String Functions are examples of in-process actions that are used to manipulate a value.

Post-Process
    A post-process action is one that is executed after the message is created or consumed. The Insert into Database Table action is an example of a post-process action: The row cannot be inserted into the database until all the data for the row has been processed.

Transactional Control

The approach described herein provides transactional control at each entity level with pre-, in-, and post-processing capability.

As part of the element mapping process, actions for data transformation or process control can be defined. Actions are similar to pre-built functions in that they may be called to perform a specific activity. In one embodiment, an XML gateway supports actions for data transformation involving math functions, string manipulations, and data conversion. In this embodiment, the XML gateway supports a set of pre-defined actions for process control. This includes user-defined procedure and function calls. Other common process control actions allow inquiries on the status of a transaction and to manage the process flow based on the status. For serious errors, the transaction can be aborted and an error message can be returned to the sender.

An action may be defined for any of the following entities:

Element
    An element is the smallest unit of a message. An action defined at the element level is applied to that element only.

Document
    A document is a collection of elements representing a business document. An action defined at the document level is applied to the document.

Root
    A root represents a collection of documents. An action defined at the root level is applied to all documents contained by the root.

In addition, some actions are designed to be applied to the element only, while others are intended for the document only.

What is claimed is:

1. A computer-implemented method for generating and using a mapping scheme, the method comprising steps of:
    receiving commands from a user, wherein said commands establish a mapping between attributes of an XML document and attributes of a relational database;
    wherein said attributes of said relational database correspond to columns in tables in said relational database;
    based on said commands, automatically generating a mapping scheme that represents said mapping, wherein said mapping scheme includes at least one of:
        multiple attributes of said XML document mapped to a single attribute of said relational database; and
        multiple attributes of said relational database mapped to a single attribute of said XML document; and
    using said mapping scheme to perform a single transformation that moves said XML document directly into said relational database: (a) without materializing said entire XML document separate from said XML document and said relational database during said transformation, and (b) without creating and storing any representation of said entire XML document separate from said XML document and said relational database during said transformation;
    wherein using said mapping scheme to perform said single transformation comprises:
        determining, based on said mapping scheme, first one or more columns of first one or more tables of said relational database to which a first XML element of said XML document maps;
        before processing a second XML element of said XML document, storing said first XML element in said first one or more columns of said first one or more tables of said relational database;
        after storing of said first XML element is completed, determining, based on said mapping scheme, second one or more columns of second one or more tables of said relational database to which said second XML element maps; and
        storing said second XML element in said second one or more columns of said second one or more tables of said relational database;
    wherein the steps of the method are performed by one or more computing devices.

2. The method of claim 1, wherein said mapping scheme further includes instructions on how to collapse a number of attributes of said XML document into a smaller number of attributes of said relational database.

3. The method of claim 1, wherein said mapping scheme further includes instructions on how to expand a number of attributes of said XML document to a greater number of attributes of said relational database.

4. The method of claim 1, wherein:
    the step of receiving commands from the user includes receiving user input that specifies a condition, and an action associated with the condition; and
    the step of using said mapping scheme to perform said single transformation further comprises the steps of:
        performing an operation that includes converting data, based on said mapping scheme, from said XML document to a format associated with said relational database;
        during performance of said operation, performing the steps of:
            determining whether the condition is satisfied; and
            if the condition is satisfied, then performing said action.

5. The method of claim 1, wherein:
    the step of receiving commands from the user includes receiving user input that specifies a specific set of instructions; and
    the step of using said mapping scheme to perform said single transformation further comprises the steps of:
        performing an operation that includes converting data, based on said mapping scheme, from said XML document to a format associated with said relational database; and
        during performance of said operation, executing the specific set of instructions to affect said operation.

6. The method of claim 1, wherein:
    the step of receiving commands from the user includes receiving user input that declares a variable to which values can be assigned; and the step of using said mapping scheme to perform said single transformation further comprises the steps of:
  performing an operation that includes converting data, based on said mapping scheme, from said XML document to a format associated with said relational database; and
  during performance of said operation, using said variable.

7. The method of claim 1, wherein:
the step of receiving commands from the user includes receiving user input that specifies a precompiled routine; and
the step of using said mapping scheme to perform said single transformation further comprises the steps of:
  performing an operation that includes converting data, based on said mapping scheme, from said XML document to a format associated with said relational database; and
  during performance of said operation, calling said precompiled routine to affect said operation.

8. The method of claim 1, further comprising:
reading source data definition that includes information about said attributes of said XML document;
reading target data definition that includes information about said attributes of said relational database; and
based on said source data definition and said target data definition, presenting to said user an interface that identifies said attributes of said XML document and said attributes of said relational database;
wherein said step of receiving commands from said user is performed by receiving said commands through said interface.

9. The method of claim 1, wherein said mapping scheme includes instructions on how to collapse a number of hierarchical levels of said XML document into a smaller number of hierarchical levels of said relational database.

10. The method of claim 1, wherein said mapping scheme includes instructions on how to expand a number of hierarchical levels of said XML document to a greater number of hierarchical levels of said relational database.

11. The method of claim 1, wherein:
a plurality of attributes of said XML document are related to each other according to a first hierarchy that includes multiple hierarchical levels;
a plurality of attributes of said relational database are related to each other according to a second hierarchy that includes multiple hierarchical levels; and
said commands establish, in said mapping, that a particular hierarchical level of said XML document is mapped to a particular hierarchical level of said relational database, wherein said particular hierarchical level of said XML document is at a different depth, within said first hierarchy, than the depth of said particular hierarchal level of said relational database within said second hierarchy.

12. The method of claim 1, wherein said single transformation is performed by executing commands defined in a programming language that supports operations to fetch said XML document directly and store said XML document directly into said relational database.

13. The method of claim 1, wherein:
said mapping scheme includes instructions which define that operations included in said single transformation are grouped to represent a transaction; and
the step of using said mapping scheme to perform said single transformation further comprises performing said operations in said transaction.

14. The method of claim 1, wherein said first one or more columns of said first one or more tables of said relational database are the same as said second one or more columns of said second one or more tables of said relational database.

15. A non-transitory computer-readable storage medium storing one or more sequences of instructions which, when executed by one or more processors, cause the one or more processors to perform steps comprising:
receiving commands from a user, wherein said commands establish a mapping between attributes of an XML document and attributes of a relational database;
wherein said attributes of said relational database correspond to columns in tables in said relational database;
based on said commands, automatically generating a mapping scheme that represents said mapping, wherein said mapping scheme includes at least one of:
  multiple attributes of said XML document mapped to a single attribute of said relational database; and
  multiple attributes of said relational database mapped to a single attribute of said XML document; and
using said mapping scheme to perform a single transformation that moves said XML document directly into said relational database: (a) without materializing said entire XML document separate from said XML document and said relational database during said transformation, and (b) without creating and storing any representation of said entire XML document separate from said XML document and said relational database during said transformation;
wherein using said mapping scheme to perform said single transformation comprises:
  determining, based on said mapping scheme, first one or more columns of first one or more tables of said relational database to which a first XML element of said XML document maps;
  before processing a second XML element of said XML document, storing said first XML element in said first one or more columns of said first one or more tables of said relational database;
  after storing of said first XML element is completed, determining, based on said mapping scheme, second one or more columns of second one or more tables of said relational database to which said second XML element maps; and
  storing said second XML element in said second one or more columns of said second one or more tables of said relational database.

16. The non-transitory computer-readable storage medium of claim 15, wherein said mapping scheme further includes instructions on how to collapse a number of attributes of said XML document into a smaller number of attributes of said relational database.

17. The non-transitory computer-readable storage medium of claim 15, wherein said mapping scheme further includes instructions on how to expand a number of attributes of said XML document to a greater number of attributes of said relational database.

18. The non-transitory computer-readable storage medium of claim 15, wherein:
the instructions that cause receiving commands from the user include instructions which, when executed by the one or more processors, cause the one or more processors to perform the step of receiving user input that specifies a condition, and an action associated with the condition; and
the instructions that cause using said mapping scheme to perform said single transformation further comprise instructions which, when executed by the one or more processors, cause the one or more processors to perform the steps of:

performing an operation that includes converting data, based on said mapping scheme, from said XML document to a format associated with said relational database;

during performance of said operation, performing the steps of:

determining whether the condition is satisfied; and if the condition is satisfied, then performing said action.

19. The non-transitory computer-readable storage medium of claim 15, wherein:

the instructions that cause receiving commands from the user include instructions which, when executed by the one or more processors, cause the one or more processors to perform the step of receiving user input that specifies a specific set of instructions; and the instructions that cause using said mapping scheme to perform said single transformation further comprise instructions which, when executed by the one or more processors, cause the one or more processors to perform the steps of:

performing an operation that includes converting data, based on said mapping scheme, from said XML document to a format associated with said relational database; and during performance of said operation, executing the specific set of instructions to affect said operation.

20. The non-transitory computer-readable storage medium of claim 15, wherein:

the instructions that cause receiving commands from the user include instructions which, when executed by the one or more processors, cause the one or more processors to perform the step of receiving user input that declares a variable to which values can be assigned; and the instructions that cause using said mapping scheme to perform said single transformation further comprise instructions which, when executed by the one or more processors, cause the one or more processors to perform the steps of:

performing an operation that includes converting data, based on said mapping scheme, from said XML document to a format associated with said relational database; and during performance of said operation, using said variable.

21. The non-transitory computer-readable storage medium of claim 15, wherein:

the instructions that cause receiving commands from the user include instructions which, when executed by the one or more processors, cause the one or more processors to perform the step of receiving user input that specifies a precompiled routine; and the instructions that cause using said mapping scheme to perform said single transformation further comprise instructions which, when executed by the one or more processors, cause the one or more processors to perform the steps of:

performing an operation that includes converting data, based on said mapping scheme, from said XML document to a format associated with said relational database; and during performance of said operation, calling said precompiled routine to affect said operation.

22. The non-transitory computer-readable storage medium of claim 15, wherein the one or more sequence of instructions further comprise instructions which, when executed by the one or more processors, cause the one or more processors to perform the steps of:

reading source data definition that includes information about said attributes of said XML document;

reading target data definition that includes information about said attributes of said relational database; and based on said source data definition and said target data definition, presenting to said user an interface that identifies said attributes of said XML document and said attributes of said relational database;

wherein the instructions that cause receiving said commands from the user comprise instructions which, when executed by the one or more processors, cause the one or more processors to perform the step of receiving said commands through said interface.

23. The non-transitory computer-readable storage medium of claim 15, wherein said mapping scheme includes instructions on how to collapse a number of hierarchical levels of said XML document into a smaller number of hierarchical levels of said relational database.

24. The non-transitory computer-readable storage medium of claim 15, wherein said mapping scheme includes instructions on how to expand a number of hierarchical levels of said XML document to a greater number of hierarchical levels of said relational database.

25. The non-transitory computer-readable storage medium of claim 15, wherein:

a plurality of attributes of said XML document are related to each other according to a first hierarchy that includes multiple hierarchical levels;

a plurality of attributes of said relational database are related to each other according to a second hierarchy that includes multiple hierarchical levels; and said commands establish, in said mapping, that a particular hierarchical level of said XML document is mapped to a particular hierarchical level of said relational database, wherein said particular hierarchical level of said XML document is at a different depth, within said first hierarchy, than the depth of said particular hierarchal level of said relational database within said second hierarchy.

26. The non-transitory computer-readable storage medium of claim 15, wherein said single transformation is performed by executing commands defined in a programming language that supports operations to fetch said XML document directly and store said XML document directly into said relational database.

27. The non-transitory computer-readable storage medium of claim 15, wherein:

said mapping scheme includes instructions which define that operations included in said single transformation are grouped to represent a transaction; and the instructions that cause using said mapping scheme to perform said single transformation further comprise instructions which, when executed by the one or more processors, cause the one or more processors to perform the step of performing said operations in said transaction.

28. The non-transitory computer-readable storage medium of claim 15, wherein said first one or more columns of said first one or more tables of said relational database are the same as said second one or more columns of said second one or more tables of said relational database.

* * * * *

UNITED STATES PATENT AND TRADEMARK OFFICE
CERTIFICATE OF CORRECTION

PATENT NO.        : 7,873,899 B2
APPLICATION NO.   : 10/656440
DATED             : January 18, 2011
INVENTOR(S)       : Singh It is certified that error appears in the above-identified patent and that said Letters Patent is hereby corrected as shown below:

On Title page, in field (56), in column 2, under "Other Publications", line 5, delete "relatioanl" and insert -- relational --, therefor.

In column 4, line 18, delete "Attributesn-1 ," and insert -- Attributes n-1, --, therefor.

In column 4, line 20, delete "Attributesn-1 ," and insert -- Attributes n-1, --, therefor.

In column 13, line 49, delete "5 10," and insert -- 510, --, therefor.

In column 14, line 19, after "etc)" insert -- . --.

Signed and Sealed this
Fourth Day of October, 2011

David J. Kappos
*Director of the United States Patent and Trademark Office*